US008240107B2

(12) United States Patent
Gallagher

(10) Patent No.: US 8,240,107 B2
(45) Date of Patent: Aug. 14, 2012

(54) SPACER ARRANGEMENT WITH FUSABLE CONNECTOR FOR INSULATING GLASS UNITS

(75) Inventor: Raymond G. Gallagher, Pittsburgh, PA (US)

(73) Assignee: Technoform Glass Insulation Holding GmbH (DE)

( * ) Notice: Subject to any disclaimer, the term of this patent is extended or adjusted under 35 U.S.C. 154(b) by 73 days.

(21) Appl. No.: 12/838,753

(22) Filed: Jul. 19, 2010

(65) Prior Publication Data

US 2010/0275538 A1 Nov. 4, 2010

Related U.S. Application Data

(62) Division of application No. 11/461,594, filed on Aug. 1, 2006, now Pat. No. 7,757,455.

(60) Provisional application No. 60/704,508, filed on Aug. 1, 2005, provisional application No. 60/716,018, filed on Sep. 9, 2005.

(51) Int. Cl.

| | |
|---|---|
| ***E04C 2/38*** | (2006.01) |
| ***E06B 3/00*** | (2006.01) |
| ***F16B 7/00*** | (2006.01) |
| ***F16B 12/36*** | (2006.01) |
| ***F16B 13/00*** | (2006.01) |

(52) U.S. Cl. ...... 52/656.9; 52/204.5; 403/270; 403/292; 403/298

(58) Field of Classification Search .................. 403/270, 403/292, 298; 156/99; 52/204.5, 843, 656.9, 52/656.1, 204.591

See application file for complete search history.

(56) References Cited

U.S. PATENT DOCUMENTS 3,083,797 A * 4/1963 Wergin ........................ 403/231

(Continued)

FOREIGN PATENT DOCUMENTS

CA 2303464 3/2009

(Continued)

OTHER PUBLICATIONS

Korean Application No. 10-2008-7003217 Office Action dated Aug. 27, 2010.

*Primary Examiner* — Branon Painter
*Assistant Examiner* — Andrew Triggs
(74) *Attorney, Agent, or Firm* — Tucker Ellis LLP

(57) ABSTRACT

A spacer frame arrangement for insulating glass units, comprising a spacer profile body extending in a first direction and having a predetermined cross section in a plane perpendicular to the first direction, the predetermined cross section defining a hollow inner space of the spacer profile body with predetermined dimensions in the plane perpendicular to the first direction, and a connector comprising a connector section adapted to be inserted in the first direction into the hollow inner space of the spacer profile body by having a cross sectional shape perpendicular to the first direction which corresponds, with predetermined tolerances, to the cross section of the spacer profile body limiting the hollow inner space, at least the outer surface of the connector section facing the inner surface of the hollow inner space of the spacer profile body after insertion of the same being made of a fusable material, preferably a material fusable by melting the same, wherein the connector section is inserted into the hollow inner space of the spacer profile body and the outer surfaces of the connector section and the inner surface of the spacer profile body facing each other are connected by fusing.

1 Claim, 12 Drawing Sheets

U.S. PATENT DOCUMENTS

| | | | | |
|---|---|---|---|---|
| 3,321,223 | A | 5/1967 | Snow et al. | |
| 4,080,482 | A | 3/1978 | Lacombe | |
| 4,222,209 | A | 9/1980 | Peterson | |
| 4,268,553 | A | 5/1981 | Marzouki et al. | |
| 4,357,744 | A * | 11/1982 | McKenzie et al. | 29/451 |
| 4,380,110 | A * | 4/1983 | Harig | 29/525 |
| 4,453,855 | A * | 6/1984 | Richter et al. | 403/295 |
| 4,454,699 | A * | 6/1984 | Strobl | 52/585.1 |
| 4,520,602 | A * | 6/1985 | Miller | 52/171.3 |
| 4,530,195 | A * | 7/1985 | Leopold | 52/717.02 |
| 4,628,582 | A * | 12/1986 | Leopold | 29/451 |
| 4,683,634 | A * | 8/1987 | Cole | 29/412 |
| 4,726,702 | A * | 2/1988 | Jackman | 403/272 |
| 5,048,997 | A * | 9/1991 | Peterson | 403/295 |
| 5,099,626 | A | 3/1992 | Seeger | |
| 5,154,531 | A * | 10/1992 | Peterson | 403/205 |
| 5,177,920 | A | 1/1993 | Rafeld | |
| 5,209,599 | A | 5/1993 | Kronenberg | |
| 5,270,091 | A | 12/1993 | Krysiak et al. | |
| 5,406,768 | A * | 4/1995 | Giuseppe et al. | 52/843 |
| 5,497,594 | A * | 3/1996 | Giuseppe et al. | 52/843 |
| 5,560,731 | A | 10/1996 | Kronenberg | |
| 5,603,582 | A | 2/1997 | Loh | |
| 5,657,590 | A | 8/1997 | Digman et al. | |
| 5,678,376 | A | 10/1997 | Poma | |
| 5,705,010 | A | 1/1998 | Larsen | |
| 5,714,214 | A | 2/1998 | Larsen | |
| 6,061,994 | A | 5/2000 | Goer et al. | |
| 6,141,874 | A * | 11/2000 | Olsen | 29/897.312 |
| 6,244,012 | B1 | 6/2001 | McGlinchy et al. | |
| 6,301,843 | B1 | 10/2001 | Silverman | |
| 6,339,909 | B1 | 1/2002 | Brunnhofer et al. | |
| 6,347,902 | B1 * | 2/2002 | Loh | 403/298 |
| 6,398,449 | B1 | 6/2002 | Loh | |
| 6,431,784 | B1 | 8/2002 | Kronenberg | |
| 6,434,910 | B1 | 8/2002 | Deane | |
| 6,439,457 | B1 | 8/2002 | Marmaropoulos | |
| 6,581,341 | B1 | 6/2003 | Baratuci et al. | |
| 6,709,187 | B2 * | 3/2004 | Loh | 403/298 |
| 6,764,247 | B1 | 7/2004 | Kronenberg | |
| 6,772,815 | B1 * | 8/2004 | Judkins | 160/84.05 |
| 6,862,859 | B2 | 3/2005 | Kronenberg | |
| 6,877,292 | B2 | 4/2005 | Baratuci et al. | |
| 6,883,278 | B2 | 4/2005 | McGlinchy et al. | |
| 6,896,440 | B2 * | 5/2005 | Trpkovski et al. | 403/294 |
| 6,935,078 | B1 | 8/2005 | Benkel | |
| 6,989,188 | B2 | 1/2006 | Brunnhofer et al. | |
| 7,076,927 | B2 | 7/2006 | Trpkovski | |
| 7,104,021 | B2 | 9/2006 | Apfelthaler | |
| 7,107,729 | B2 | 9/2006 | Baratuci et al. | |
| 7,124,546 | B2 | 10/2006 | Scharff et al. | |
| 7,549,818 | B2 | 6/2009 | Rafeld | |
| 7,757,455 | B2 * | 7/2010 | Gallagher | 52/656.5 |
| 7,856,791 | B2 * | 12/2010 | Rosskamp et al. | 52/786.13 |
| 2005/0100691 | A1 | 5/2005 | Brunnhofer et al. | |
| 2007/0022700 | A1 * | 2/2007 | Gallagher | 52/656.9 |
| 2007/0261795 | A1 * | 11/2007 | Rosskamp et al. | 156/556 |
| 2008/0152849 | A1 * | 6/2008 | Lenhardt | 428/34 |

FOREIGN PATENT DOCUMENTS

| | | |
|---|---|---|
| DE | 3324646 | 1/1985 |
| DE | 3236110 | 10/1985 |
| DE | 3211890 | 11/1986 |
| DE | 3307578 | 12/1988 |
| DE | 3408600 | 2/1991 |
| DE | 3435022 | 3/1991 |
| DE | 4444888 | 6/1995 |
| DE | 29503442 | 6/1995 |
| DE | 4441769 | 1/1998 |
| DE | 29921227 | 4/2000 |
| DE | 29921229 | 4/2000 |
| DE | 29908867 | 11/2000 |
| DE | 29909447 | 11/2000 |
| DE | 19961902 | 7/2001 |
| DE | 10124829 | 11/2002 |
| DE | 20116365 | 3/2003 |
| DE | 20304330 | 9/2004 |
| DE | 20312497 | 1/2005 |
| DE | 202004004933 | 8/2005 |
| DE | 202004004734 | 10/2005 |
| DE | 202004013686 | 2/2006 |
| DE | 202005004601 | 3/2006 |
| DE | 202004016328 | 4/2006 |
| EP | 0065074 | 3/1985 |
| EP | 0283689 | 4/1991 |
| EP | 0292595 | 11/1991 |
| EP | 0339319 | 11/1991 |
| EP | 0535305 | 8/1994 |
| EP | 0651124 | 8/1997 |
| EP | 0681083 | 5/1998 |
| EP | 0687790 | 6/1999 |
| EP | 0750090 | 8/1999 |
| EP | 0606565 | 10/1999 |
| EP | 0710762 | 1/2000 |
| EP | 0778389 | 5/2000 |
| EP | 1344583 | 6/2004 |
| EP | 1231353 | 4/2006 |
| EP | 1522669 | 11/2008 |
| EP | 1655442 | 4/2009 |
| GB | 2321924 | 8/1998 |
| WO | WO 9119404 | 12/1991 |
| WO | WO 9805843 | 2/1998 |
| WO | WO 9934083 | 7/1999 |
| WO | WO 02071904 | 9/2002 |

* cited by examiner (a)

(b)

(c)

(a)

(b)

(a) (b) (c)

SPACER ARRANGEMENT WITH FUSABLE CONNECTOR FOR INSULATING GLASS UNITS

CROSS-REFERENCE TO RELATED APPLICATIONS

This application is a divisional application of U.S. application Ser. No. 11/461,594, filed on Aug. 1, 2006, now U.S. Pat. No. 7,757,455, and which claimed the benefit of U.S. Provisional Application No. 60/704,508, filed on Aug. 1, 2005, and U.S. Provisional Application No. 60/716,018, filed on Sep. 9, 2005, all of which are incorporated herewith.

BACKGROUND OF THE INVENTION

The present invention relates to a spacer arrangement with fusable connector for insulating glass units.

In the field of insulating glass units (hereinafter IG units), the use of a tubular spacer bar to separate panes of glass forming an IG unit, has been around the window industry for many years. It has been common practice, when fabricating a rectangular IG unit, to cut the spacer bar into specific lengths and connect the four spacer pieces with some sort of connector device or corner key to form the corners of the spacer bar arrangement (frame) of the IG unit. The device used to connect the spacer pieces to form a corner, which could be a square corner or some other angled corner, is called a corner key. In order to conserve spacer material, miscellaneous lengths of spacer bar are often connected with a linear spacer key arrangement. The design of the corner key and its material selection has varied over the years. Typically, the corner key is a stamped metal part, a cast alloy piece or an injected molded plastic material. Other materials have been tried, but these are the most common material selections. With regard to corner key design, the shape and/or cross section has varied greatly with each designer searching for the optimum ease of insertion and resistance to pull-out. Also some spacer keys are designed to allow desiccant pass through, and others have been designed for ease of mechanically crimping the spacer to the key. Also used was high temperature welding for a steel spacer corner section.

Understandably, spacer connectors are an important component of the IG unit. They serve as a mechanical connection between the linear spacer pieces so that a functional tubular spacer or glass separator is formed to be used as an integral part of the finished IG unit. Typically, after the spacer bar pieces are connected to form a closed rectangular frame, sealant is used to bond the desiccant-filled spacer to the glass surface. Variations in the IG unit assembly process have been developed in the fenestration industry's search for the most cost effective IG manufacturing process. For example, a folding corner key was developed so that the spacer forming process could be a linear process. Also, the technology of "corner bending" was developed to eliminate the corner key, but in this case, a linear key is usually still required to complete the spacer frame. In addition, the Intercept IG technology on in-line spacer manufacturing has made the economics of spacer fabrications quite cost effective. Most of this spacer technology has been developed over the last seventy years, and the search continues to continually improve the spacer manufacturing process.

The TGI spacer from Technoform as described in US 2005/0100691 A1 or EP 1 529 920 A2 is a plastic metal composite spacer, where the inside of the spacer profile is made of plastic.

A conventional metal spacer, as shown in U.S. Pat. No. 6,339,909, can be made of metal such as aluminum or stainless steel or the like such that the inside of the spacer profile is made of metal.

The connectors or keys have been metal or nylon-like pieces with barbed teeth designed for easy insertion and difficult extraction or pull-out. Both corner keys and linear keys are available. These connectors seem to work reasonably well, but they are expensive per piece and several pieces may be needed for each spacer frame. Also, they can be ineffective in holding the spacer pieces together under specific conditions/circumstances, and they can be difficult to insert because the gripping teeth must be pushed into or along the interior surface of the spacer cross section.

This invention should overcome at least some of the short comings encountered with the use of conventional spacer connectors.

As mentioned, the spacers may have a metal inside surface or a plastic inside surface. It is proposed that a spacer connector be utilized that (1) has a shape and size tolerances for easy insertion into the spacer cavity, (2) is composed of a low cost plastic, in one embodiment similar to the TGI spacer interior lining, and (3) is fused to the interior surface of the spacer cross section.

This last feature (3) has particular significance because it is a unique concept of bonding the connector to the spacer for superior bond strength and convenience. Significantly, this proposal entails a relatively low temperature fusable process, that is, with a temperature range from room temperature to about 600° F. (approx. 315° C.). Fusing in this sense encompasses, in case of a spacer having a plastic inside surface, fusing by creating a material connection by melting of the inside plastic surfaces of the spacer and the outer plastic surface of the connector such that the molten materials mix and have an irreversible material connection after cooling down as well as, in case of a spacer having a metal inside surface, a strong adherence created by melting the outer plastic surface of the connector such that a strong adhesion and/or bond to the inside metal surface of the spacer is present after cooling down.

Often times, the conventional spacer key will work loose from its mechanical connection, allowing the spacer pieces to separate from each other.

This results in a failed IG unit because of moisture penetration at the open joint. With the proposed bonding, the spacer joint is fused together, and it performs as strong welded joint which prevents joint opening.

That means, it is proposed that a low cost connector be utilized as a "bonding component" for IG spacers.

There are several methods of creating this fused connection between the key, such as a corner key or a linear key, and the spacer.

A few methods are suggested in the following, and of course, the following listing is not intended to be all inclusive:

(1) Direct application of heat via conductive heat to fuse a thermoplastic connector and the thermoplastic or metal spacer liner. This conductive heat could be applied with direct contact between the heater and the joint area.

(2) Use of radiation heat from a flame or IR lamp to heat the joint.

(3) Use of hot air heating from an intense hair drier-like device.

(4) Use of friction welding, since welding equipment is available that will rapidly move the joint parts relative to each other causing friction heat that induces a fused joint.

(5) Use of ultrasonic or RF (including microwave) welding, whereby the material molecules are vibrated and this motion generates heat, and the heat causes the materials to soften and bond together.

(6) Use of chemicals on the surface of the components that cause the surfaces to fuse together. The connecting of plastic pipes is an example of this method.

(7) Use of an adhesive, glue or sealant to accomplish the desired joint.

These are just a few examples of the possible methods of fusing the spacer connectors to the spacer bars. In summary, the use of a low temperature, fused spacer connection is a unique approach to solving the problems or shortcomings of the present day connectors.

SUMMARY OF INVENTION

In accordance with the subject application, there is provided a spacer arrangement with fusable connector for insulating glass units.

In accordance with the subject application, there is provided a spacer arrangement with a fusable connector for insulating glass units which includes at the least the following benefits: increased connector-to spacer joint strength; reduced insertion effort on the production line; reduced IG unit field problems; and lower IG component costs.

Further, in accordance with the subject application, there is provided a spacer frame arrangement for insulating glass units. The spacer frame arrangement includes a spacer profile body extending in a first direction (Z) and having a predetermined cross section in a plane (X, Y) perpendicular to the first direction (Z), the predetermined cross section defining a hollow inner space of the spacer profile body with predetermined dimensions in the plane (X, Y) perpendicular to the first direction (Z). The spacer frame arrangement also includes a connector, which includes a connector section adapted to be inserted in the first direction (Z) into the hollow inner space of the spacer profile body by having a cross sectional shape perpendicular to the first direction (Z) which corresponds, with predetermined tolerances, to the cross section of the spacer profile body limiting the hollow inner space, at least the outer surface of the connector section facing the inner surface of the hollow inner space of the spacer profile body after insertion of the same being made of a fusable material, preferably a material fusable by melting the same. In the spacer arrangement, the connector section is inserted into the hollow inner space of the spacer profile body and the outer surfaces of the connector section and the inner surface of the spacer profile body facing each other are at least partly connected by fusing.

Still further, in accordance with the subject application, there is provided a method for manufacturing a spacer frame arrangement for insulating glass units. The method includes the step of inserting, into a spacer having a hollow spacer profile body extending in a first direction (Z) and having a predetermined cross section in a plane (X, Y) perpendicular to the first direction (Z), the predetermined cross section defining a hollow inner space of the spacer profile body with predetermined dimensions in the plane (X, Y) perpendicular to the first direction (Z), a connector section of a connector, the connector section being adapted to be inserted in the first direction (Z) into the hollow inner space of the spacer profile body by having a cross sectional shape perpendicular to the first direction (Z) which corresponds, with predetermined tolerances, to the cross section of the spacer profile body limiting the hollow inner space, at least the outer surface of the connector section facing the inner surface of the hollow inner space of the spacer profile body after insertion of the same being made of a fusable material, preferably a material fusable by melting the same. The method further includes the step of joining the spacer and the connector by fusing the connector section and the inner surface of the hollow inner space of the spacer profile body.

Still further, in accordance with the subject application, there is provided an apparatus for manufacturing a spacer frame arrangement for insulating glass units. The apparatus comprises a spacer frame arrangement holding means adapted for holding a spacer frame arrangement comprising a hollow spacer profile body and a connector having a connector section inserted into the hollow spacer profile body. The apparatus also comprises a fusing device adapted for fusing the connector and the inside of the hollow spacer profile body in the spacer frame arrangement held by the spacer frame arrangement holding device.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawing and descriptions will be regarded as illustrative in nature and not as restrictive.

BRIEF DESCRIPTION OF THE DRAWINGS

In the following, embodiments of the connector and the application thereof are described referring to the drawings of which.

DETAILED DESCRIPTION OF THE PREFERRED EMBODIMENT

Figure 1:
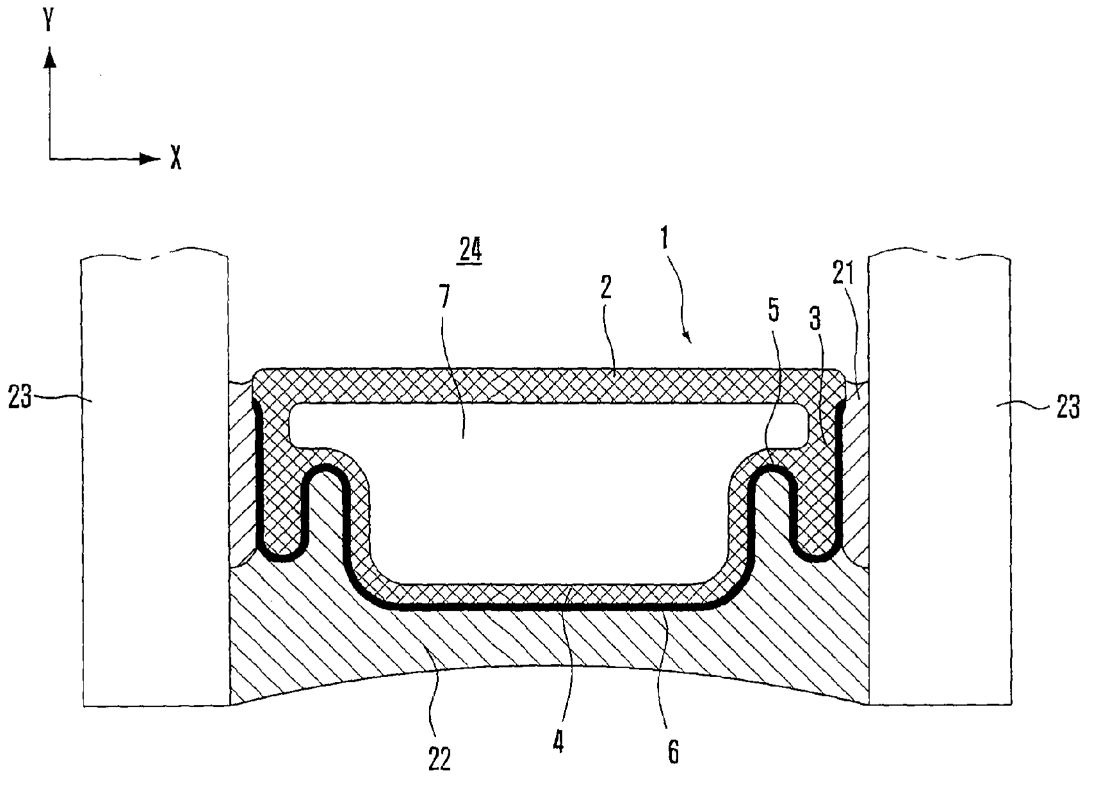
FIG. 1 shows a cross sectional view of a TGI spacer profile 1 in a partial cross sectional view of an IG unit.
Figure 2:
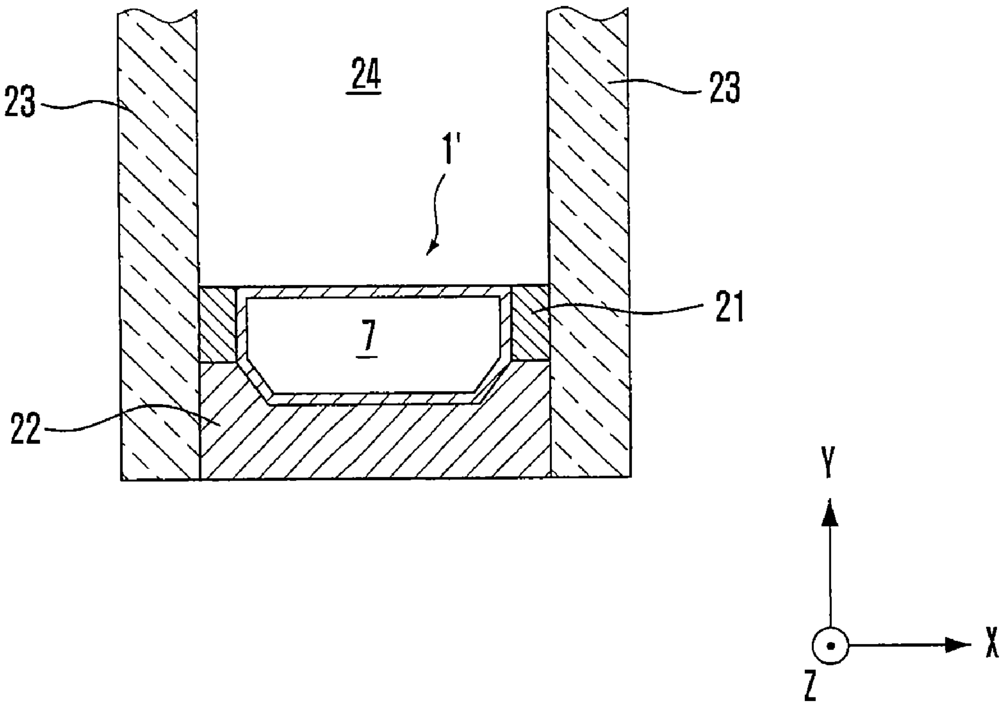
FIG. 2 shows a cross sectional view of a metal spacer profile 1' in a partial cross sectional view of an IG unit.

Referring to FIGS. 1 and 2, the window panes 23 extend in parallel limiting a window pane interspace 24 in planes parallel to the X and Z directions. The outer circumference of the interspace 24 is limited by a spacer frame made of a (cylindrical, preferably hollow) spacer profile 1, 1' and the adhesive and sealing materials 21, 22, as set in US 2005/0100691 A1, the contents of which are incorporated by reference herein.

Figure 3:
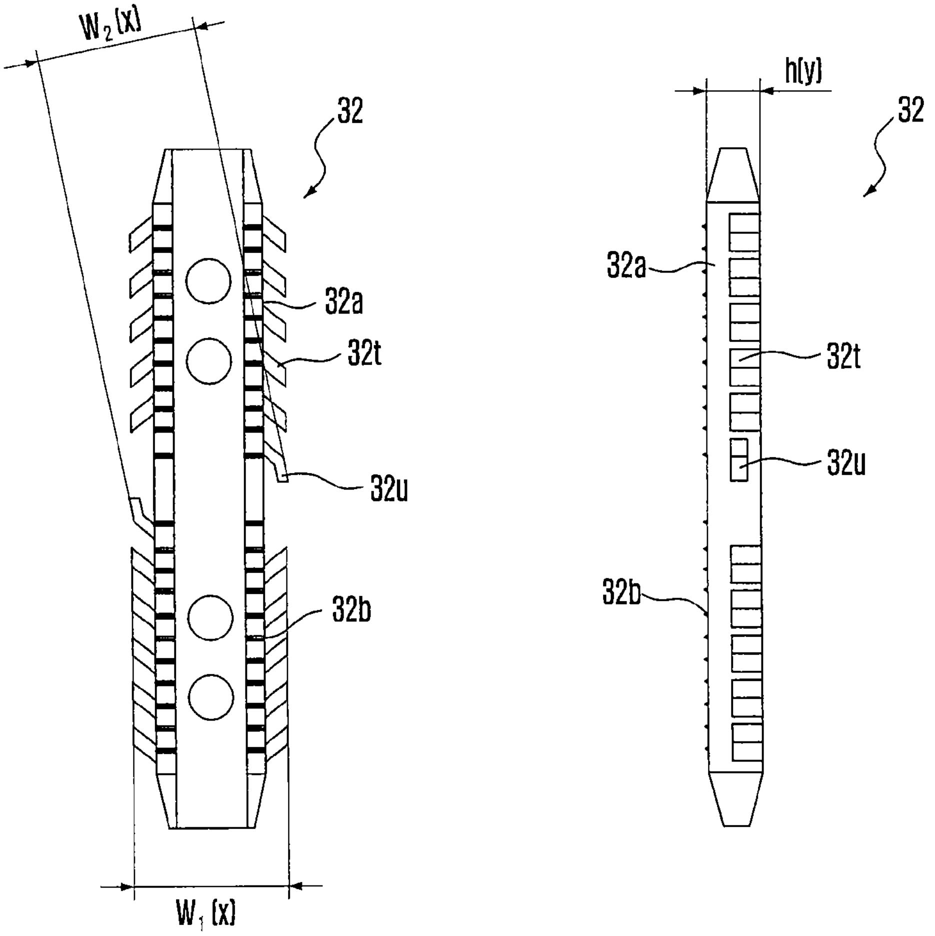
FIG. 3 shows an embodiment of a fusable linear connector shaped in a barbed teeth design, in a) in a plain view, in b) in a side view from the left side in a), and in c) in a front view seen from the top in a)
Figure 3:
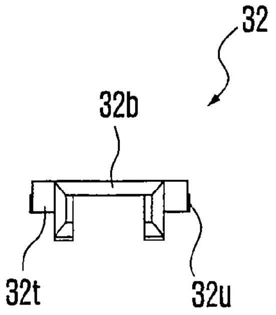
Figure 4:
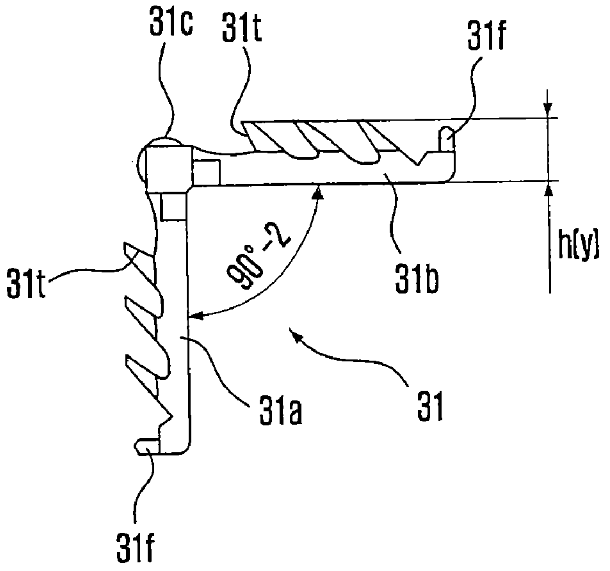
FIG. 4 shows an embodiment of a 90° corner connector in a barbed teeth design, in a) in a side view and in b) in a plain view from the top in a)
Figure 4:
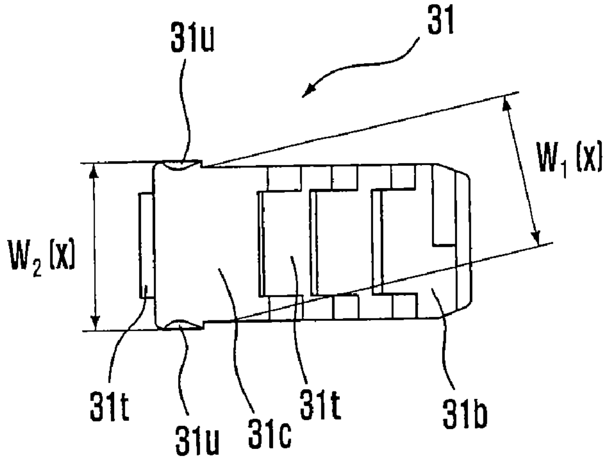
Figure 5:
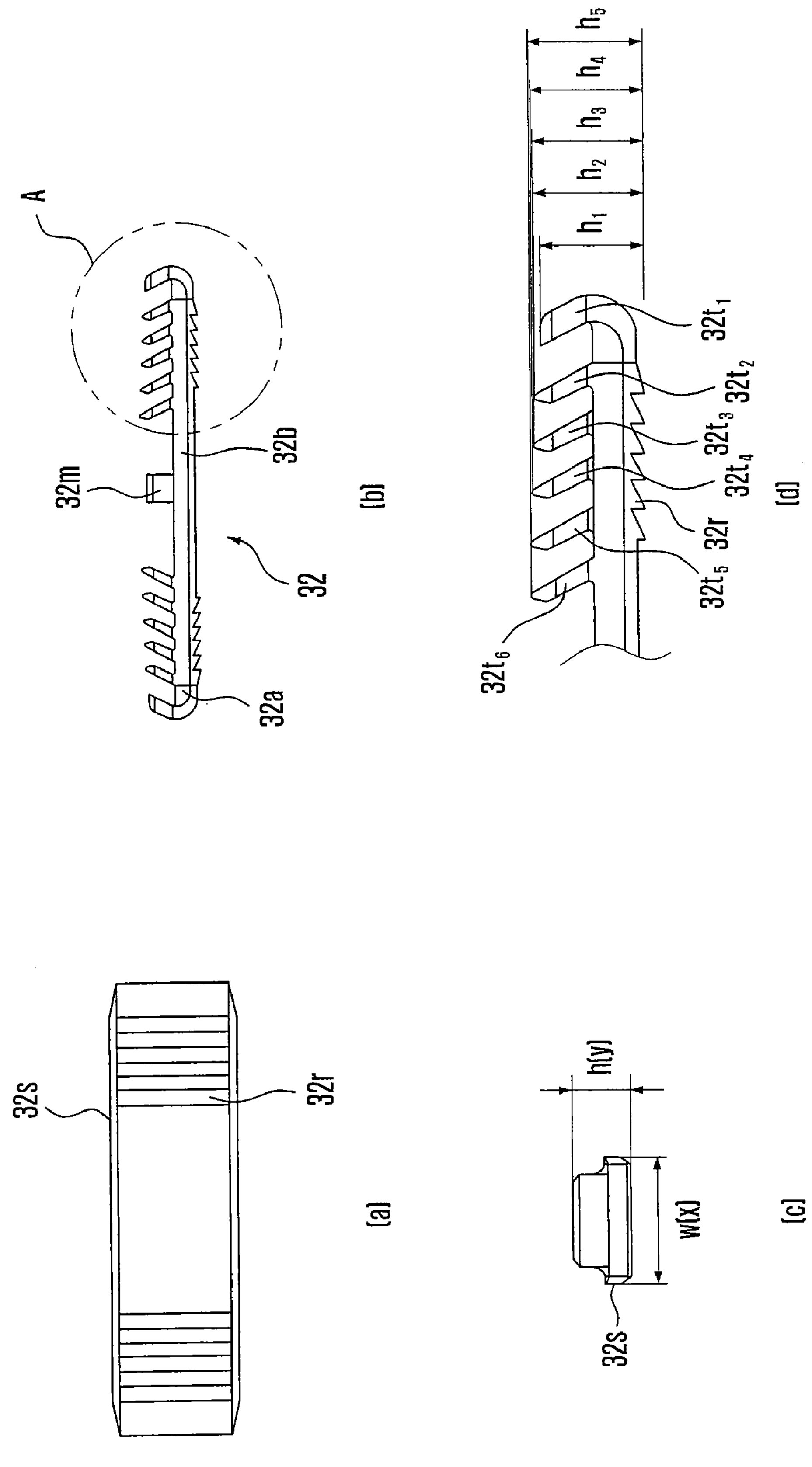
FIG. 5 shows an embodiment of a fusable linear connector shaped in a barbed teeth design, in a) in a plain view on a wider side, in b) in a side view from the top in a), in c) in a front view seen from the right side in b), and in d) an enlarged view of the portion encircled by circle A in b)
Figure 6:
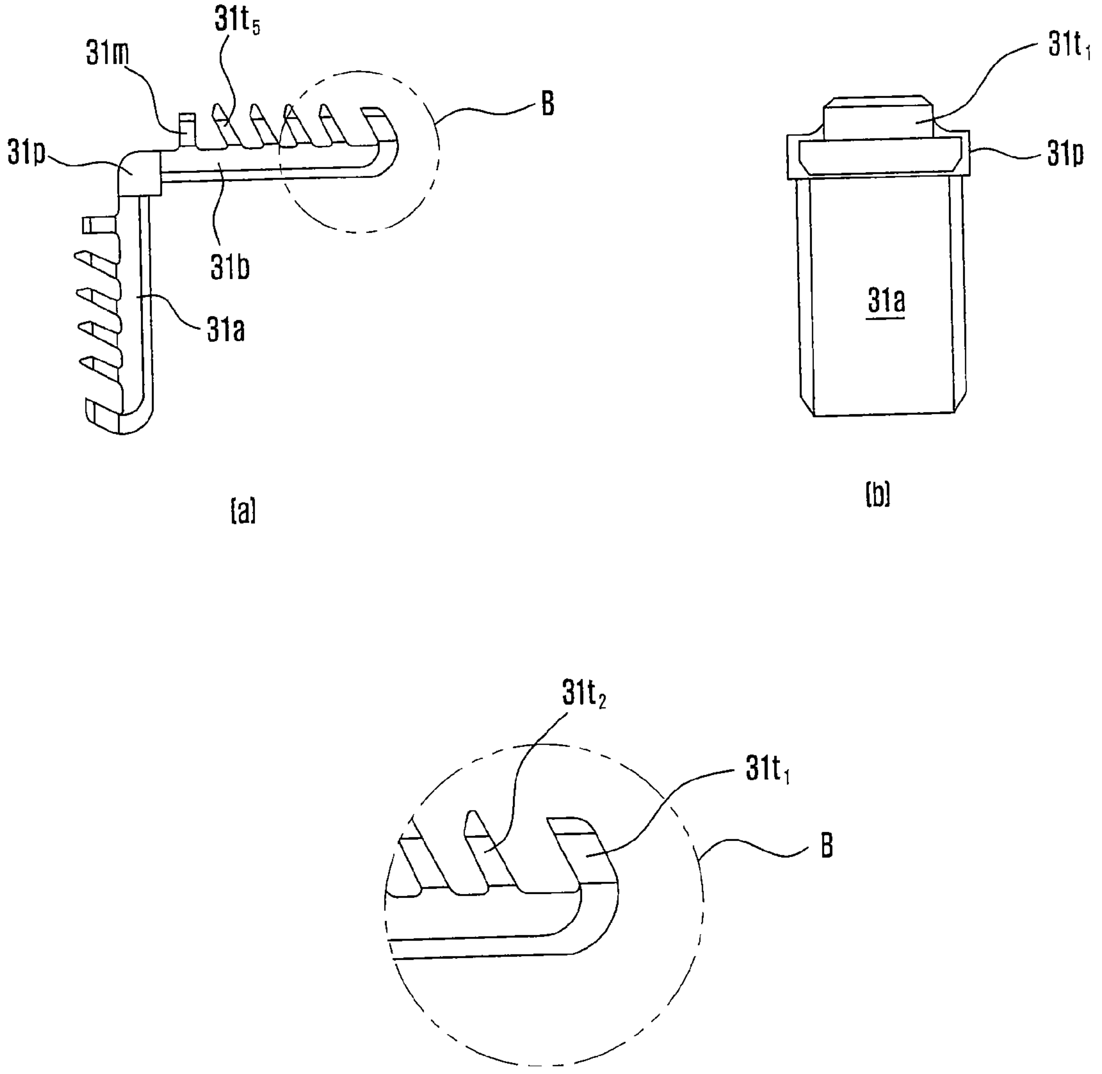
FIG. 6 shows an embodiment of a 90° corner connector in a barbed teeth design, in a) in a side view, in b) in a front view from the right side in a), and in c) an enlarged view of the portion encircled by circle B in a)

In order to provide the spacer profile frame mentioned above, one or plural linear connectors as shown e.g. in FIG. 3 or 5 and/or 90° corner connectors as shown e.g. in FIG. 4 or 6 are suitably used.

As already mentioned above, the TGI spacer profile is an example of a spacer profile representing a plastic metal composite spacer.

The inside (inner lining) of such a profile is made of an elastically-plastically deformable material wherein preferred in elastically-plastically deformable materials include synthetic or natural materials that undergo plastic, irreversible deformation after the elastic restoring forces of the bent material have been overcome. In such preferred materials, substantially no elastic restoring forces are active after deformation (bending) of the spacer profile beyond its apparent yielding point. Representative plastic materials also preferably exhibit a relatively low heat conductivity (i.e., preferred materials are heat-insulating materials), such as heat conductivities of less than about 5 W/(mK), more preferably less than about 1 W/(mK), and even more preferably less than about 0.3 W/(mK). Particularly preferred materials for the profile body are thermoplastic synthetic materials including, but not limited to, polypropylene, polyethylene terephthalate, polyamide and/or polycarbonate. The plastic material(s) may also contain commonly used fillers (e.g. fibrous materials), additives, dyes, UV-protection agents, etc. Preferred materials for the profile body optionally exhibit a heat conduction value that is at least about 10 times less than the heat conduction value of the reinforcement material of the profile, more preferably about 50 times less than the heat conduction value of the reinforcement material and most preferably about 100 times less than the heat conduction value of the reinforcement material. The inside of such a profile may comprise polypropylene Novolen 1040K, or polypropylene MC208U, which comprises 20% talc, or polypropylene BA110CF, which is a heterophasic copolymer, both of which are available from Borealis A/S of Kongens Lyngby, Denmark, or Adstif® HA840K, which is a polypropylene homopolymer available from Basell Polyolefins Company NV.

The material of a corner connector 31 or a linear connector 32 is preferably, at least at the outer surfaces facing the inner surface of the spacer profile 1, made of Nylon® 6, or the same materials as the inside of the spacer profile. Other materials, which are compatible in forming fused interfaces with the inside material of the spacer profile 1 are also suitably chosen as the material for the complete connectors 31, 32 or at least as the material for the outer surface of the connectors 31, 32. Preferably, the connectors 31, 32 are made of polyamide, most preferred of Nylon® 6, or polypropylene.

Figure 7:
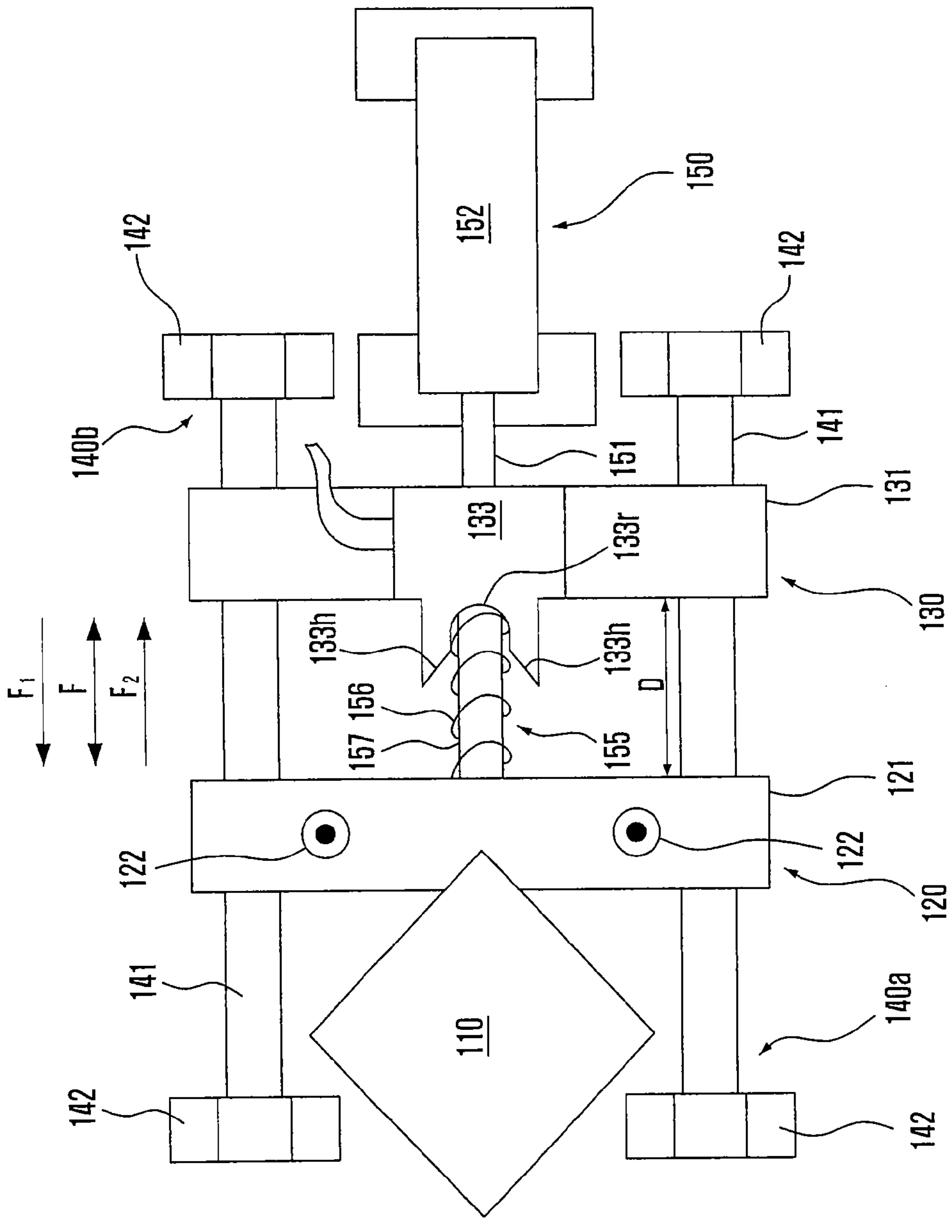
FIG. 7 shows a plain view of an apparatus for manufacturing a spacer frame arrangement for insulating glass units.

Referring to FIGS. 4, 6 and 7, the 90° corner connector 31 comprises two insertion sections 31*a*, 31*b*, connected with each other to form the connector 31. Referring to FIGS. 3, 5 and 7, the linear connector 32 comprises two insertion sections 32*a*, 32*b*, connected with each other to form the connector 32. When the connectors 31, 32 are used to connect the spacer profiles 1*a*, 1*b*, and 1*c*, 1*d*, respectively, the insertion sections 31*a*, 31*b*, 32*a*, 32*b*, respectively, are inserted into the respective spacer profile sections (or pieces) 1*a*, 1*b*, 1*c*, 1*d*, respectively.

The sections 31*a*, 31*b*, 32*a*, 32*b* of the connectors 31, 32, which are to be inserted into the inner space 7 of the spacer profile 1 have a cross sectional shape perpendicular to the direction of insertion, which corresponds to the cross sectional shape of the inner space 7 of the spacer profile, preferably partly with slightly smaller dimensions allowing an easy insertion into the inner space 7 of the spacer. The reminder of the connector preferably has cross sectional dimensions being so close to the inside of the spacer that the fusing of the interfaces, as described above, is possible, i.e. being at least partly in contact with the inside of the spacer. For example, for a TGI spacer having a width in the X direction shown in FIG. 1 of 15.5 mm, the maximum width in the X direction of the inner space 7 is approx. 13.5 mm, and the height of the inner space 7 in the Y direction is approx. 4.9 mm. In such a case, the undermeasure of the cross section of the connector 31, 32 to be inserted into the inner space 7 is preferable in the range of 0.2 mm. The undermeasure should be in a range from 5 to 0.5%, preferably from 4 to 1%, of course depending on the total spacer dimensions.

Preferably, the connector has a slightly conical shape tapering in the direction of insertion, i.e. having the smaller cross section at the tip of the connector inserted into the spacer profile. With the conical shape, the dimension of the cross section can have at least partly undermeasures.

Such a conical shape in combination with a mutually corresponding cross sectional shapes (dimensional fit) allows to overcome problems with production tolerances of the cross sectional shapes.

The connectors 31, 32 of FIGS. 3 to 6 have a cross sectional shape, where protrusions/teeth 31*t*, 31*f*, 32*r*, 32*t*, 32*u* are provided on a connector body 31*c*, 32*c*.

The connectors 31, 32 have a barbed teeth design, i.e. at one or more of the outer surfaces facing the inside of the spacers after insertion, protrusions in form of teeth are provided, which have an inclination against the direction of insertion, i.e. the tips of the protrusions are pointing away from the tip of the connector to be inserted into the spacer.

Also with this design, the connector has a cross sectional shape perpendicular to the direction of insertion, which approximately corresponds to the cross sectional shape of the inner space 7 of the spacer profile after the connector was inserted into the inner space. The reason is that protrusions are formed to be resilient such that they are bent, during the insertion, in a direction opposite to the direction of insertion. Now, when the protrusions are formed such that the connector has a cross section approximately corresponding to the cross sectional shape of the inner space, when the protrusions/teeth are bent correspondingly, the cross sectional shape of the connector does not correspond to the cross sectional shape of the inner space before insertion but it is transformed into cross sectional shape approximately corresponding to the cross sectional shape of the inner space after insertion.

Referring to FIGS. 3 to 6, that means that the widths w1, w2 (the widths in the X direction, if an insertion into the spacer profiles 1, 1' shown in FIG. 1, 2 is considered) and the height h (the height in the Y direction of FIG. 1, 2) are selected such that an approximate correspondence of the cross sections is achieved after insertion. For example, in FIG. 3, the protrusion/teeth 32*t*, 32*u* are not provided over the complete height h. As a result, if such a connector is inserted into a cross sectional profile as shown in FIG. 1, 2, a better adaption to the non-rectangular cross sections of the profiles 1, 1' is possible.

Furthermore, it has to be noted that also the barbed teeth design connectors shown in FIGS. 3 and 4 have a conical shape of the tips to be inserted into the spacer profile, where in case of the corner connector of FIG. 3, also the front teeth 31*f* are formed to have a smaller height to create during insertion.

Understandably, the force exerted by the barbed teeth design can be much lower than the forces necessary for conventional barbed teeth designs. The force needs to be only sufficient, to establish a sufficient contact between the outer surface of the connector and the inner surface of the spacer profile until the fusing process resulted in the fused connection. There is no need for securing a strong holding force by friction between the teeth and the spacer inside over the life time of the resulting IG unit, because the holding force is obtained by the fusion.

The connector 32 shown in FIG. 3 comprises protrusions 32*t*, 32*u* at the side walls of a U-shaped body 32*c*. As it is obvious from a comparison of the cross sectional shape of the profiles in FIG. 1, 2 and the cross sectional shape of the connector in FIG. 3*c*), the height h(y) of the connector preferably corresponds closely to the height of the profile in a space whereas the width ($w_1$(x)) is preferably larger than the widths of the profile in a spacer such that, after insertion, the protrusions are bent and contact the inner side of the profile in order to be fused. The connector 31 shown in FIG. 4 comprises protrusions 31*t*, 31*f* at one (the lower) side of bar-shaped insertion sections 31*a*, 31*b* (lower side if seen in the orientation of being inserted in the profiles in FIG. 1, 2) forming the body 31*c* of the corner connector 31. It is again clear from a comparison of the cross sectional shapes of the profiles in FIG. 1, 2 and the cross sectional shape of the corner key that the width ($w_1$(x)) of the insertion sections 31*a*, 31*b* preferably corresponds closely to the width of the profile inner space whereas the height h(y) is preferably larger than the height of the profile inner space such that, after insertion, the protrusions 31*t*, 31*f* are bent and contact the inner side of the profile in order to be fused. Accordingly, the dimensions of the connector in the direction of protruding of the protrusions may be larger than the corresponding dimension of the profile (spacer) inner space, and the dimensions of the connector in the direction perpendicular to the direction of protruding of the protrusions is preferably closely corresponding to the dimension of the profile inner space. The embodiment of a linear connector 32 shown in FIG. 5 is a linear connector like the connector 32 shown in FIG. 3 but with protrusions 32*t* at the lower side (similar to the corner connector of FIG. 4) instead of protrusions protruding to the lateral sides. With respect to the dimensions of the connector 32 of FIG. 5, the same applies as said above with respect to the corner connector of FIG. 4 because of the same "orientation" of the protrusions. The connector 32 of FIG. 5 comprises six protrusions at each insertion section 32*a*, 32*b*. The protrusions 32$t_1$ at the tip end of the insertion sections 32*a*, 32*b* has a first height $h_1$, which is preferably approximately equal to the height of the profile inner space. The heights ($h_2$ to $h_5$) of the protrusions increases towards the center of the connector ($h_2<h_3<h_4<h_5$). The two innermost protrusions 32$t_5$ and 32$t_6$ on each side have the same (largest) height $h_5$. As can be seen in FIG. 5*b*), the connector 32 comprises a box-shaped protrusion 32*m* in its center which has the same height $h_1$ as the first protrusion 32$t_1$ at the tip ends on both sides. Additionally, the connector 32 of FIG. 5 comprises smaller (than the protrusions 32*t*) hook-like protrusions 32*r* (over approximately one third of its length at each end) at its upper side (=the lower side in FIG. 5). The embodiment of the corner connector 31 shown in FIG. 6 comprises the basic design of the protrusions of the linear connector of FIG. 5, but with five instead of six protrusions 31$t_1$, . . . , 31$t_5$ at each insertion portion 31*a*, 31*b*. A box-shaped protrusion 31*m* is provided on each insertion section 31*a*, 31*b* as the innermost protrusion. Abutment protrusions 31*p* are provided on both lateral sides of the connector in the same way as in the connector of FIG. 4.

The protrusions 31$t_1$ . . . on the lower side of the linear and corner connectors in FIGS. 5 and 6 have an angle of inclination of approximately 30°.

Although the features of the four connectors shown in FIGS. 3 to 5 may be combined, the embodiments shown in FIGS. 5 and 6 are preferred for fusing the profile and the connector. In this respect, it is mentioned again that there is no need for securing a strong holding force by friction between the teeth (protrusions) and the spacer inside over the lifetime of the resulting IG unit, but it is necessary to allow and obtain a fusion of the same. For this application, the form the protrusions shown in FIGS. 5 and 6 is preferred.

In the following, a method and an apparatus for manufacturing the spacer frame arrangement for insulating glass units are described. An apparatus 100 for manufacturing such a spacer frame arrangement is shown in FIGS. 7 to 10. The apparatus 100 comprises a base plate 101 (see FIG. 9). A spacer support means 110, which is implemented as a spacer support block in this embodiment, is mounted on the base plate 101 via a holder 102. A spacer holding device (spacer holding means) 120 for holding the spacer profiles during a fusing processing, and a heating device (heating means) 130 are mounted on the base plate 101 via linear guides 140*a*, 140*b* to be linearly moveable in the directions of arrow F. Each linear guide comprises a guide bar 141 secured to the base plate by means of bar holders 142.

An actuating means 150 comprising a pneumatic cylinder 152 is mounted on the base plate 101. A cylinder rod 151 of the pneumatic cylinder 152 is connected to the heating device 130 such that the actuating means is adapted to be an actuator for reciprocally moving the heating device 130 in the directions of arrow F. As a further part of the actuating means 150, an urging device 155 is provided which comprises a helical spring 156 and a spring guide bar 157. The spring guide bar 157 is fixed to the spacer holding device 120 and penetrates the heating device 130 in a manner that the spring guide bar can move relative to the heating device 130 in the direction of arrow F in a range from a maximum distance D between the spacer holding device 120 and the heating device 130 shown in FIG. 7 to a state of complete compression of the helical spring 156. The limitation of the distance to the maximum distance D is achieved by an abutment protrusion 157*a* at the free end of a spring guide bar 157.

The spacer support block 110 has a square shape seen from the top and a height $h_{110}$. At two adjacent lateral sides, a groove 111 is provided which has a shape adapted to the spacer profile shape as explained further below.

The spacer holding device 120 comprises a support block 121, which is linearly moveable on the guide bars 141 in the directions of arrow F. On the top side of the support block 121, two holding rolls 122 are mounted. The holding rolls 122, 122 have a distance between each other in a horizontal direction perpendicular to arrow F. The spacer support block 110 is arranged such that, considering the square shape seen from the top, one of the diagonals of the square shape intersects a connection line between the two holding rolls 122, 122 at its center. As a result, when the spacer holding device is moved in the directions of arrow F, the holding rolls 122 always have the same distance from the spacer support block 110. In the top view of FIG. 7, the groove 111 is provided in the two adjacent lateral sides facing the holding rolls 122.

The heating device 130 comprises a support block 131, which is linearly moveable on the guide bars 141 in the directions of arrow F. On the top side of support block 131, a heating device 132 is provided. The heating device comprises a copper body 133. The copper body has a shape such that a heat transfer portion protrudes towards the spacer holding device 120. In the present embodiment, the heat transfer portion has a fork-like shape with a recess 133*r* between two protruding portions with heat transfer edges 133*h*, which enclose an angle of 90° when seen from the top as in FIG. 7.

The above described embodiment of the apparatus is adapted to manufacture spacer frame arrangements with corner connectors, as will become apparent from the following description of the operation.

In case the apparatus should be adapted to manufacture spacer frame arrangements with linear connectors, the orientation of spacer holder block 110 has to be changed by 45° in the top view. Further, considering the dimensions of the spacer holding block 110 shown in FIGS. 7 to 10, either the distance between the holding rolls 122, 122 has to be reduced or a corresponding horizontal dimension of the spacer holding block 110 in the direction perpendicular to arrow F has to be increased. Furthermore, the shape of the heat transfer portion has to be adapted such that the heat transfer edges 133*h* extend horizontally perpendicular to arrow F.

In the following, the operation of the apparatus shown in FIGS. 7 to 10 is explained. In the top view of FIG. 7, cylinder rod 151 is retracted into the pneumatic cylinder 152, such that the heating device 130 is in its retracted position. Because the biasing force of helical spring 156, the spacer holding device 122 is at the maximum distance D.

Figure 10:
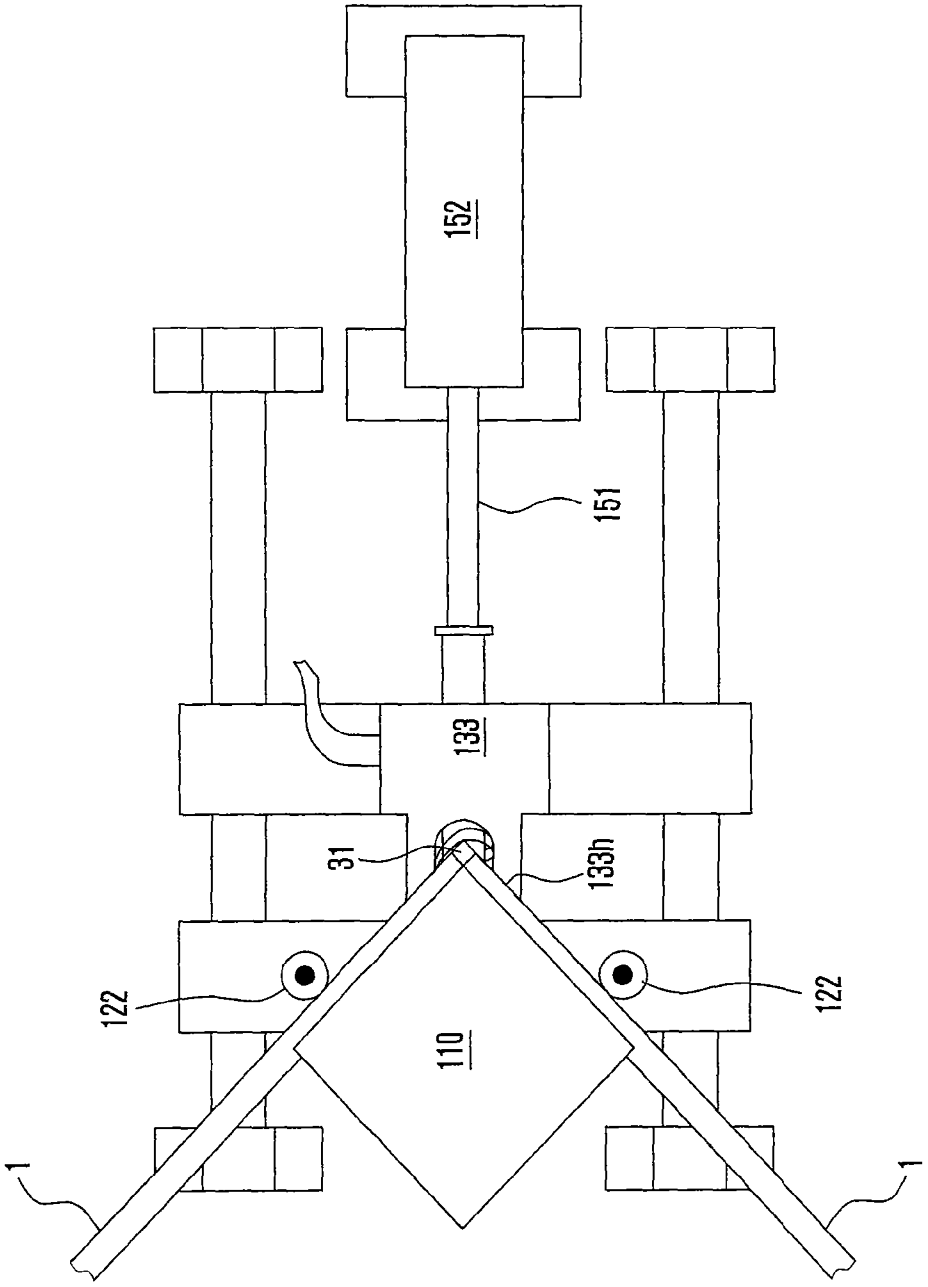
FIG. 10 shows a plain view of the apparatus corresponding to the plain view in FIG. 8 with a spacer frame arrangement.
Figure 11:
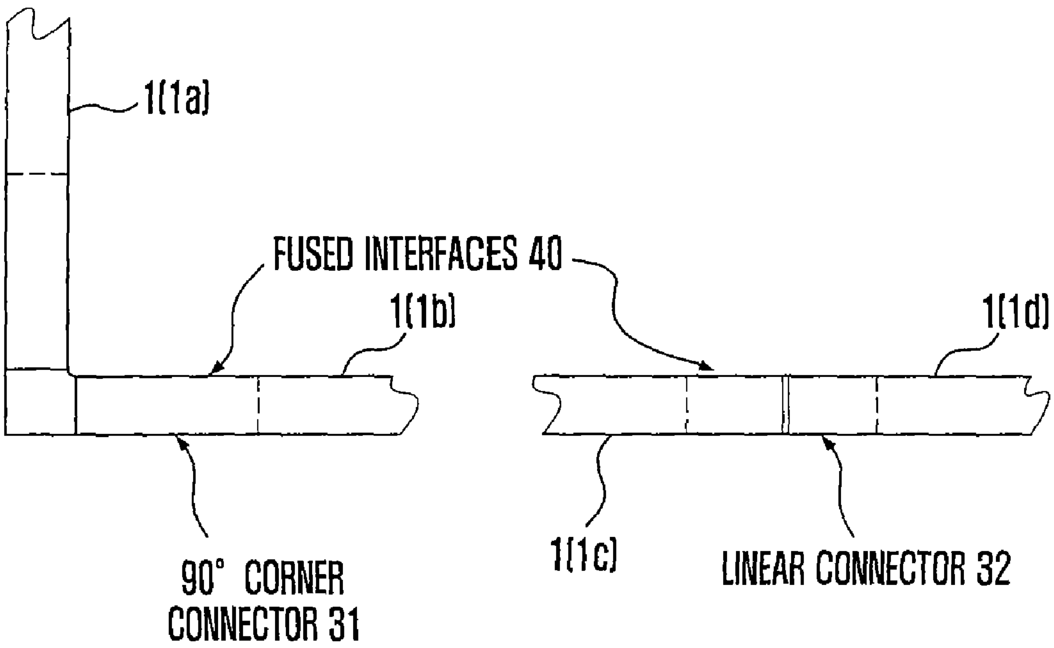
FIG. 11 shows two embodiments fused to spacer bar profiles.

A spacer frame arrangement consisting of two spacer profile portions 1, into which corner connector is inserted in the same manner as shown in FIG. 11, is inserted into the groove 111 of the spacer holding block 110 as shown in FIG. 10. Assuming that the spacer profile is a cross sectional shape as shown in FIG. 1, the groove 111 has a cross sectional shape allowing the insertion of the spacer profile. In other words, a height $h_{111}$ is slightly larger than the width of a spacer profile in the X-direction in FIG. 1.

With this spacer profile arrangement, with the spacer profile portions 1 and the corner connector not yet fused and inserted into groove 111 of the spacer holding block 110, the pneumatic cylinder 152 is actuated such that the rod 151 is pushed in the direction of arrow F1. Consequently, the heating device 130 is pushed in the direction of arrow F1 and, by means of the helical spring 156, the spacer holding device 120 is pushed in the direction of arrow F1.

First, the holding rolls 122 of the spacer holding device 120 will come into contact with spacer profile portions 1, with a holding force corresponding to the force excerted by spring 156. The cylinder rod 151 is moved in the direction of arrow F1 until the heat transfer edges 133*h* contact the outside of the spacer profile portions 1, as shown in FIG. 10.

In this position, the corner connector inserted into the spacer profile portions is in contact with the inside of the spacer profile portions. The heating device is operated and heat is transferred via the heat transfer edges 133*h* to the outside of the spacer profile portions 1. Consequently, the materials of the inside of the spacer profile portions and of the connector are partly molten.

Thereafter, the heat device is slightly retracted by some millimeters in the direction of arrow F2. However, because helical spring 156 still excerts a force to the spacer holding device 120, the spacer profile arrangement is still held in the spacer holding block 110 via the holding rolls 122. After a short time of some seconds, the molten parts of the spacer profile inside and of the connector are cooled down such that they are fused.

Now, the cylinder rod 151 is retracted completely to the position shown in FIG. 7 such that the fused spacer profile arrangement can be removed from the spacer holding block 110.

Figure 8:
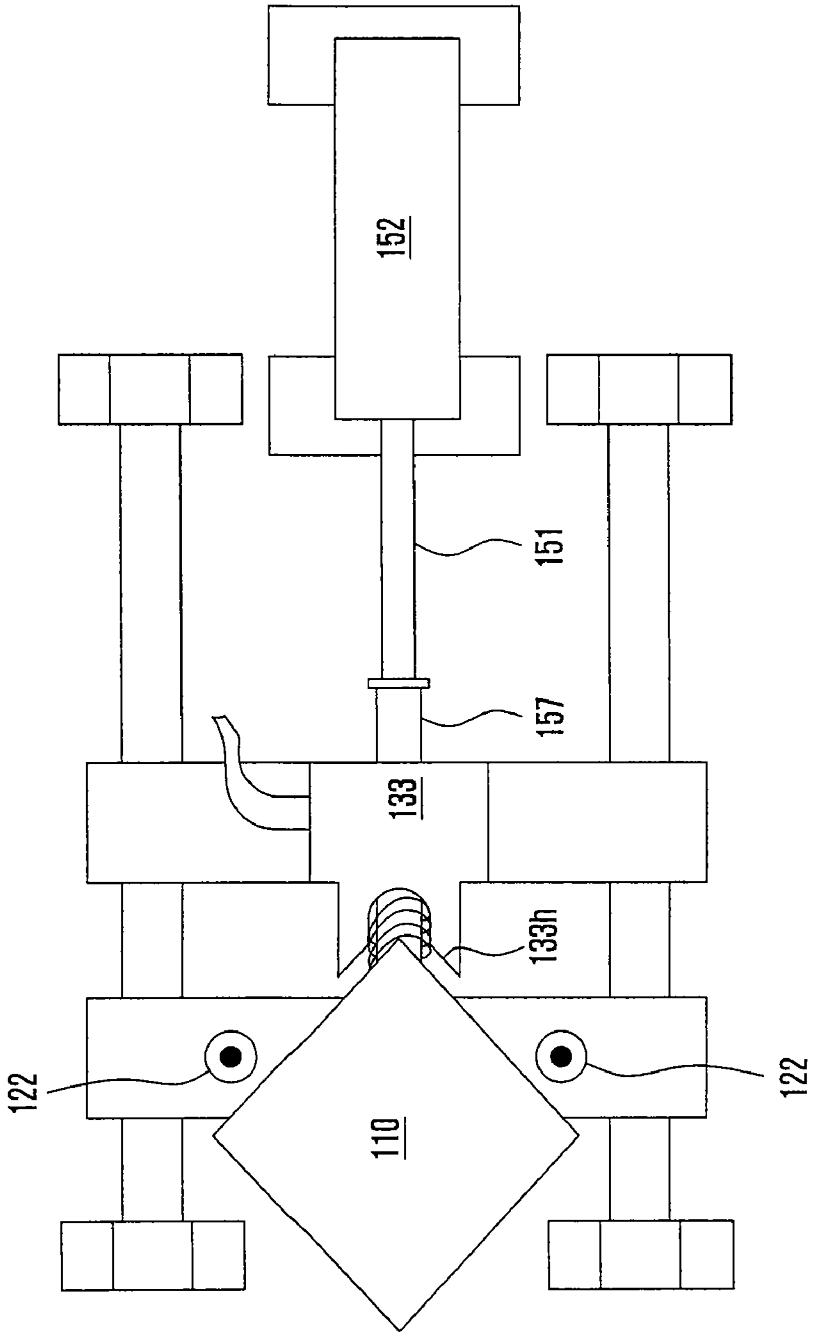
FIG. 8 shows a plain view of the apparatus of FIG. 7 with a spacer fixing device and a heating device in fusing operation positions.
Figure 9:
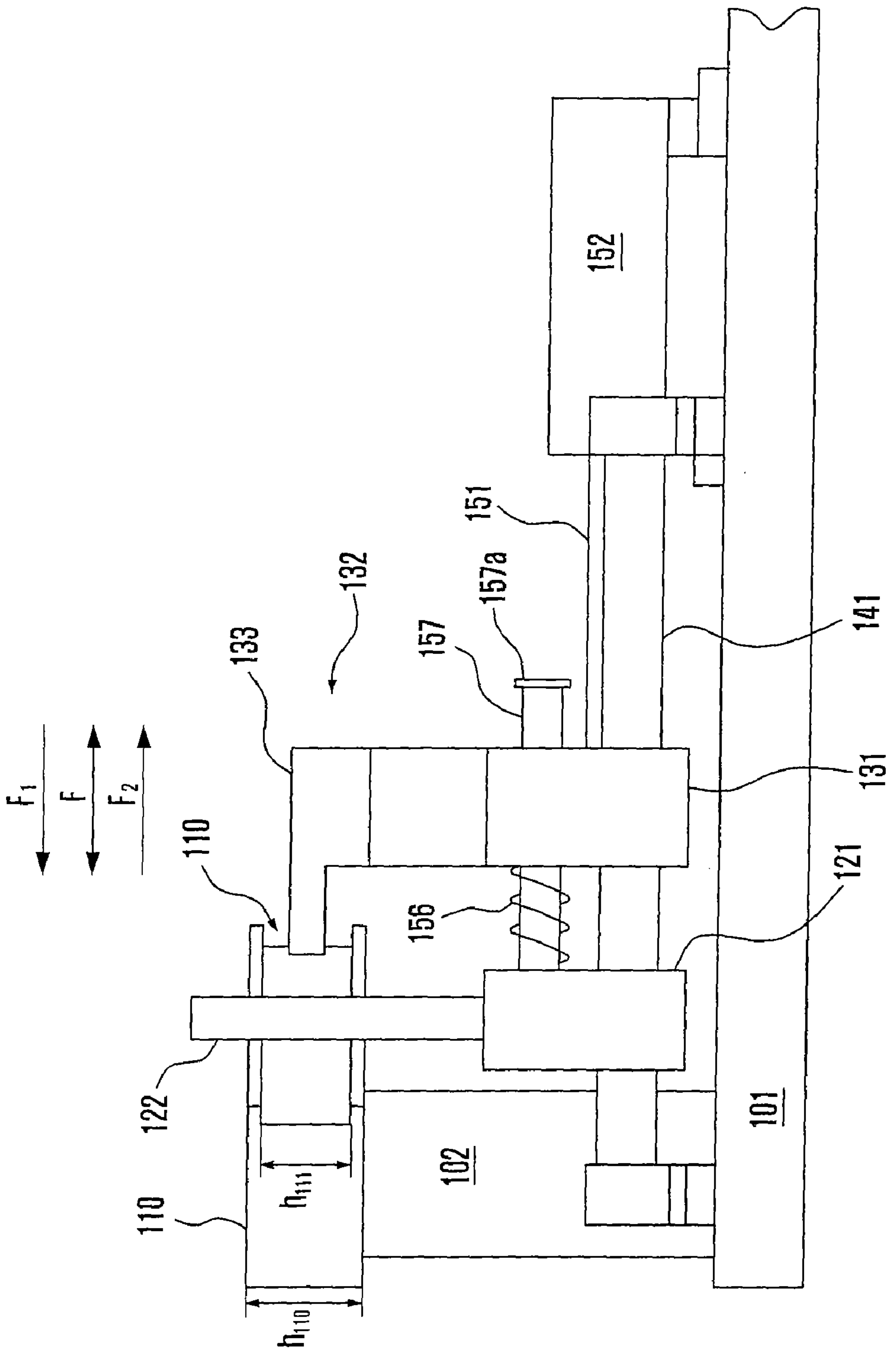
FIG. 9 shows a side view of the apparatus shown in FIG. 8.

In FIGS. 8 and 9, the apparatus is shown in the same position as in FIG. 10, but without a spacer profile arrangement. Of course, it is clear to the skilled person that, in such a situation, holding device 120 would move further until the support block 121 abuts against holder 102 due to the force excerted by spring 156. However, in FIGS. 9 and 10, the "frozen" position of the holding device 120 is shown, as if a spacer profile arrangement was present as shown in FIG. 10 in order to clearly show the operational positions.

Independent of the design of the apparatus shown in FIGS. 7 to 10, in order to manufacture a spacer profile arrangement, wherein the connection between the spacer profile portions and the connector is obtained by fusing, a method can be applied wherein the connector and the inside of the spacer profile portions are joint by fusing with any of the methods indicated further above.

Figure 12:
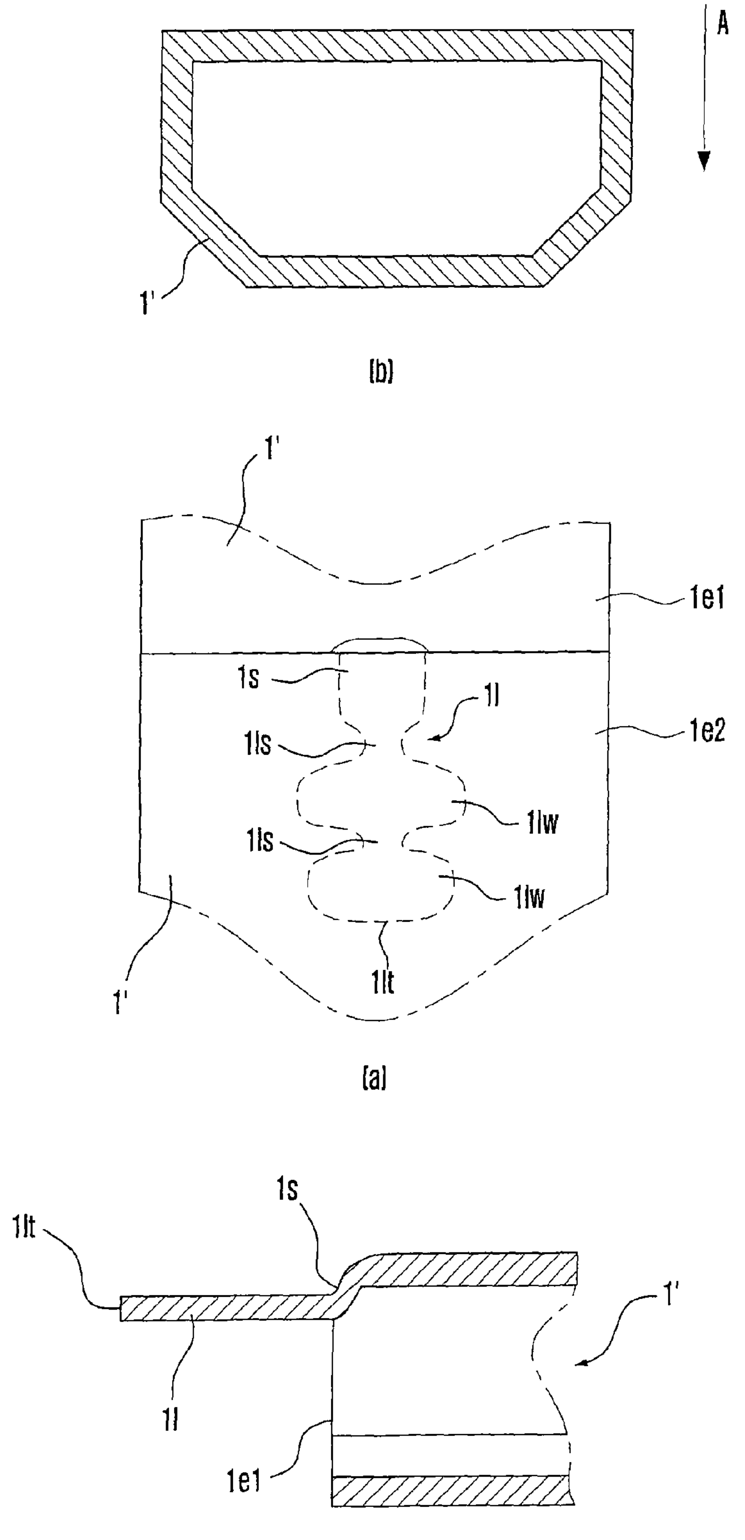
FIG. 12 shows an embodiment of an end connection design for a metal spacer profile preferably used together with the fusable connector.

A further advantageous application of the fusable connector in connection with the metal spacer profile 1' is described with respect to FIG. 12. When a spacer frame is formed of a metal spacer profile 1', at least in one position, two ends of the metal spacer profile 1' have to be connected, for example by a linear connector. Such a situation is shown in FIG. 12*a*) where two ends 1*e*1 and 1*e*2 of metal spacer profiles 1', the cross sectional shape of which is shown in FIG. 12*b*), contact each other. The direction of the view in FIG. 12*b*) is in the direction of the arrow A in FIG. 12*b*). At one of the two ends, in this case at the end 1*e*1, a metal latch 1*l* is provided protruding from the end in the longitudinal direction of the spacer profile. Such a metal latch can be provided at a corresponding end of the metal profile easily during manufacturing process, e.g. by pressing/punching. The latch 12 preferably has a form, where one section 1*lw* of latch 1*l* closer to its tip 1*lt* is wider than another section 1*ls* closer to its stem 1*s*. Preferably, the latch 1*l* has waved shape. FIG. 12*c*) shows a side view from the right side in FIG. 12*b*).

It is obvious that this latch 1*l* can be easily inserted into the other end 1*e*2. If a fusable connector according to the invention is used for connecting two ends with such a latch, the melting of the fusable connector will result in that a form fit of the fusable connector and of the latch is generated, increasing the joined strength. Additionally, it is possible to provide impressions at the inside of the other end 1*e*2, which will result in a further form fit with the molten material of the connector further increasing the joined strength.

Accordingly, the present application teaches a fusable connector for a spacer for an insulating glass unit, the spacer having a hollow spacer profile body extending in a first direction and having a predetermined cross section in a plane perpendicular to the first direction, the predetermined cross section defining a hollow inner space of the spacer profile body with predetermined dimensions in the plane perpendicular to the first direction, the connector comprising a connector section adapted to be inserted in the first direction into the hollow inner space of the spacer profile body by having a cross sectional shape perpendicular to the first direction which corresponds, with predetermined tolerances, to the cross section of the spacer profile body limiting the hollow inner space, at least the outer surface of the connector section facing the inner surface of the hollow inner space of the spacer profile body after insertion of the same being made of a fusable material, preferably a material fusable by melting the same. Such a connector may have a conical shape tapering in the direction of insertion. Such a connection may have a cross sectional shape of the connector section that has a predetermined undermeasure in a plain perpendicular in the direction of insertion.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A spacer frame arrangement for insulating associated glass units, the spacer frame arrangement comprising:

a spacer profile body extending in a first direction and having a predetermined cross section in a plane perpendicular to the first direction, the predetermined cross section defining a hollow inner space of the spacer profile body with predetermined dimensions in the plane perpendicular to the first direction, the spacer profile body being formed at least on the inside limiting the inner space of polypropylene; and, a connector comprising a connector section having a barbed teeth design with resilient protrusions in a form of teeth formed at one or more outer surfaces of the connector and being adapted to be inserted in the first direction into the hollow inner space of the spacer profile body by having a cross sectional shape perpendicular to the first direction which corresponds, within predetermined tolerances, to the cross section of the spacer profile body limiting the hollow inner space, at least the outer surface of the connector section facing the inner surface of the hollow inner space of the spacer profile body after insertion of the same being made of polyamide, wherein the connector section is inserted into the hollow inner space of the spacer profile body and the inner surface of the spacer profile body is fuse-connected with the teeth.

* * * * *